(12) United States Patent
Riddering et al.

(10) Patent No.: US 6,359,754 B1
(45) Date of Patent: Mar. 19, 2002

(54) INCREASED MECHANICAL SPACING THROUGH LOCALIZED CONTINUOUS CARBON OVERCOAT

(75) Inventors: Jason W. Riddering, Bloomington; Zine-Eddine Boutaghou, Vadnais Heights; Lance Eugene Stover, Eden Prairie; Peter Raymond Segar, Burnsville; Daniel Paul Burbank, Minneapolis, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/329,429

(22) Filed: Jun. 10, 1999

Related U.S. Application Data

(60) Provisional application No. 60/094,419, filed on Jul. 21, 1998.

(51) Int. Cl.[7] .............................. G11B 5/71; G11B 5/255
(52) U.S. Cl. ................................. 360/236.6; 360/235.2
(58) Field of Search ............................ 360/235.2, 236.6

(56) References Cited

U.S. PATENT DOCUMENTS

| | | | |
|---|---|---|---|
| 5,151,294 A | * 9/1992 | Bleich et al. | 427/11 |
| 5,159,508 A | * 10/1992 | Grill et al. | 360/103 |
| 5,175,658 A | * 12/1992 | Chang et al. | 360/103 |
| 5,336,550 A | * 8/1994 | Ganapathi et al. | 428/216 |
| 5,388,017 A | * 2/1995 | Franco et al. | 360/103 |
| 5,515,219 A | * 5/1996 | Ihrke et al. | 360/103 |
| 5,624,581 A | * 4/1997 | Ihrke et al. | 216/22 |
| 5,654,850 A | * 8/1997 | Ganapathi et al. | 360/103 |
| 5,721,650 A | * 2/1998 | Crane et al. | 360/103 |
| 5,768,055 A | * 6/1998 | Tian et al. | 360/103 |
| 5,808,832 A | * 9/1998 | Chen et al. | 360/103 |
| 5,985,163 A | * 11/1999 | Cha et al. | 216/22 |
| 5,986,851 A | * 11/1999 | Angelo et al. | 360/103 |
| 6,014,288 A | * 1/2000 | Cha et al. | 360/103 |
| 6,038,101 A | * 3/2000 | Yoda et al. | 360/103 |
| 6,084,743 A | * 7/2000 | Comstock et al. | 360/97.02 |

FOREIGN PATENT DOCUMENTS

| | | | |
|---|---|---|---|
| EP | 0 568 252 A1 | * | 11/1993 |
| EP | 0 644 534 A1 | * | 3/1995 |
| JP | 56-077949 | * | 6/1981 |
| JP | 60-193181 | * | 10/1985 |
| JP | 5-282646 | * | 10/1993 |
| JP | 7-296350 | * | 11/1995 |
| JP | 10-3631 | * | 1/1998 |
| JP | 11-031315 | * | 2/1999 |

* cited by examiner

*Primary Examiner*—William Klimowicz
(74) *Attorney, Agent, or Firm*—Kinney & Lange, P.A.

(57) ABSTRACT

An air bearing slider for a disc drive has an overcoat localized on the air bearing surface to provide a continuous covering over a leading portion of the air bearing surface. The overcoat terminates in a trailing cut-off line, and a trailing portion of the air bearing surface is not covered by overcoat. The overcoat also covers the pole tips of the transducer at a pole tip recession from the air bearing surface. The leading portion covered by the overcoat includes all of the air bearing surface that contacts the disc during contact/start/stop, which is protected by a uniform continuous overcoat layer. The trailing cut-off line is disposed at an angle to expose the trailing corners of the air bearing surface, such that all of the overcoat is elevated above the lowermost portion of the air bearing surface through pitch and roll angles of flying at inner and outer radii. Methods of applying the localized overcoat include subtractive and additive photolithographic deposition processes. The overcoat over the pole tips protects the pole tips during subsequent processing steps of forming the slider cavity.

17 Claims, 6 Drawing Sheets

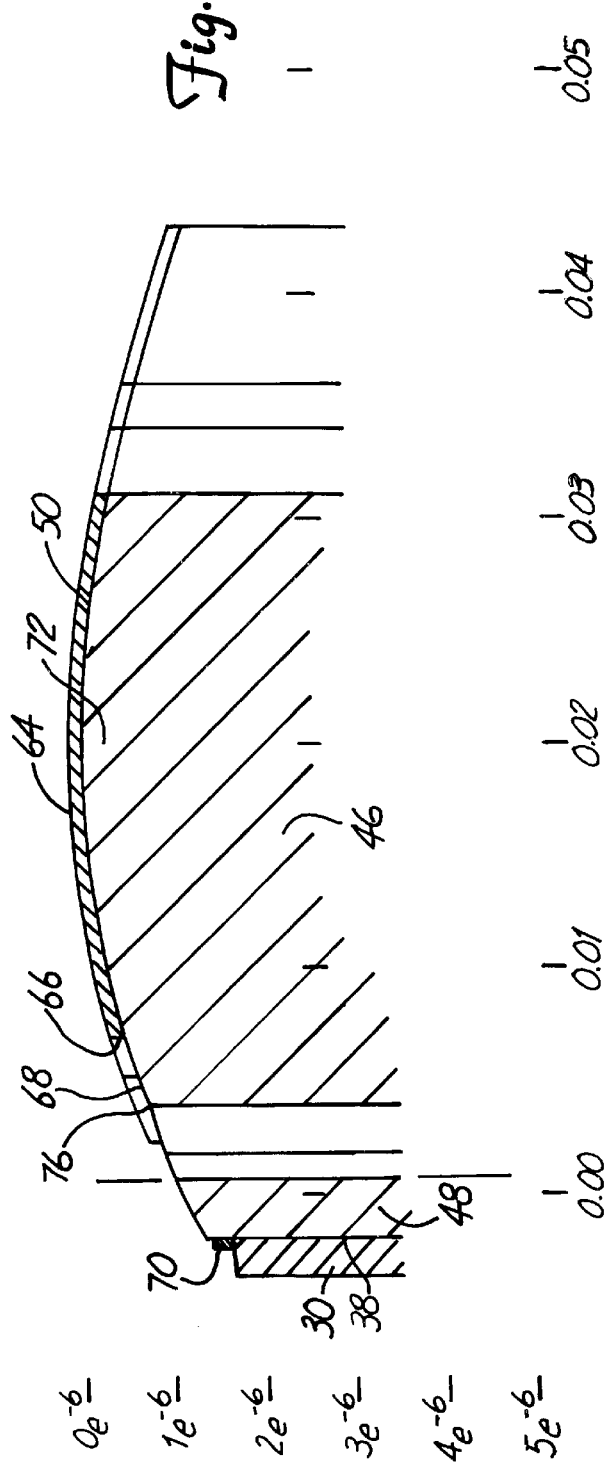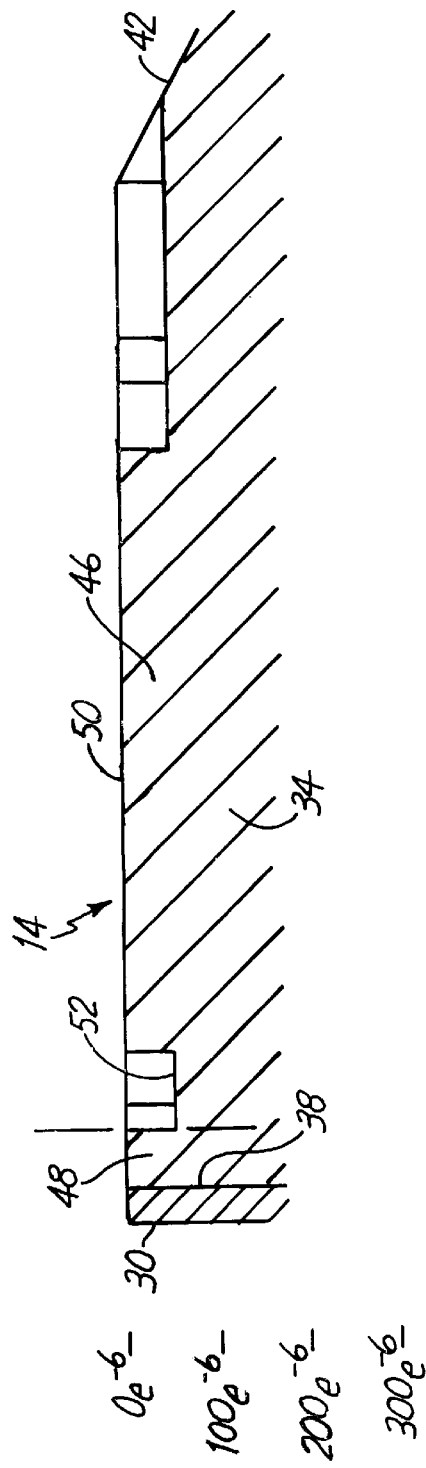

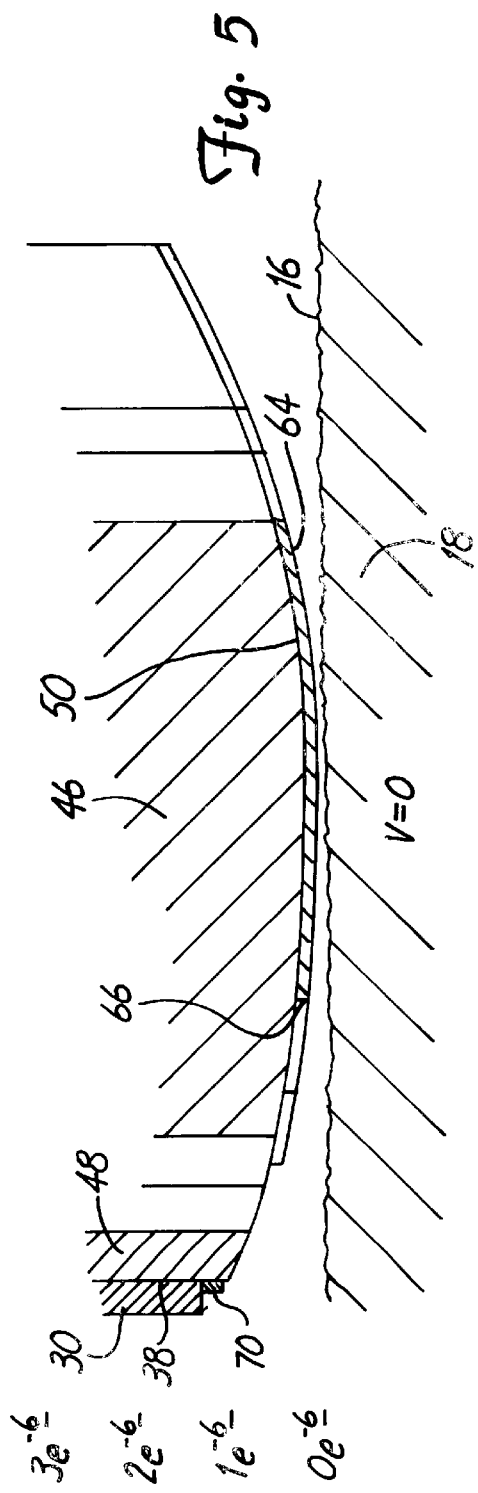
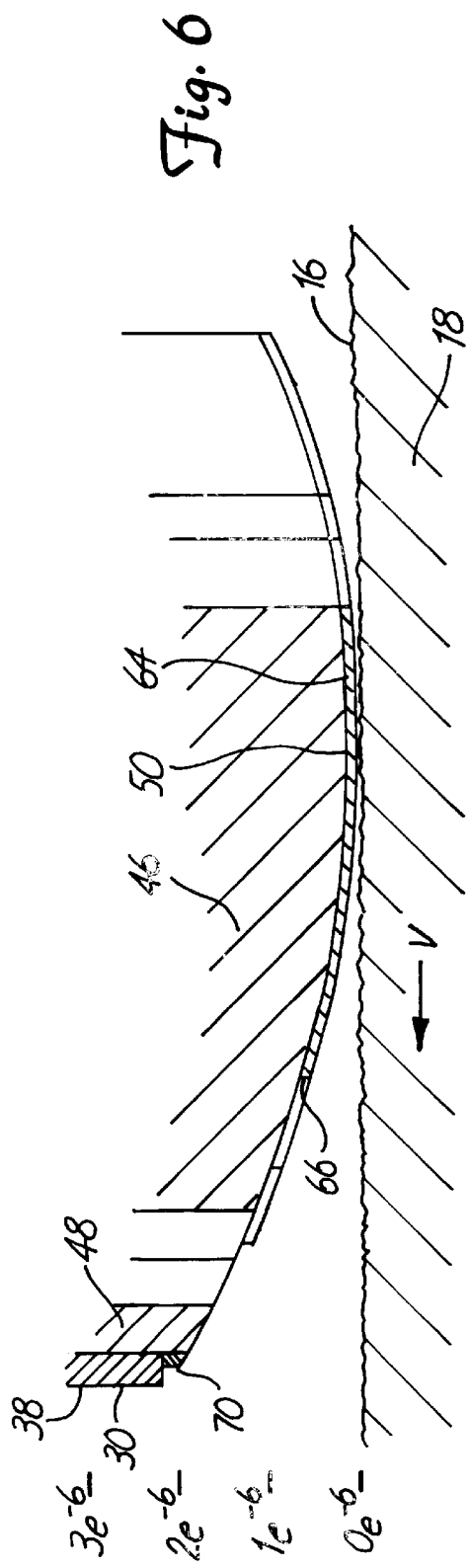

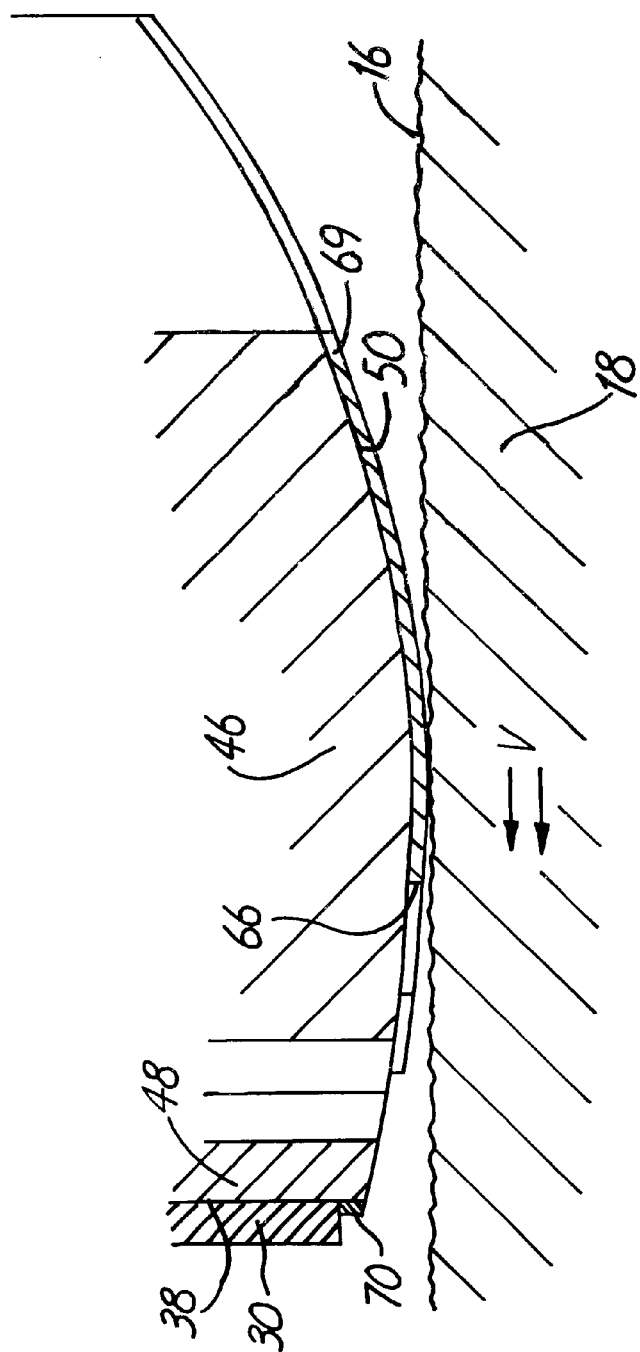

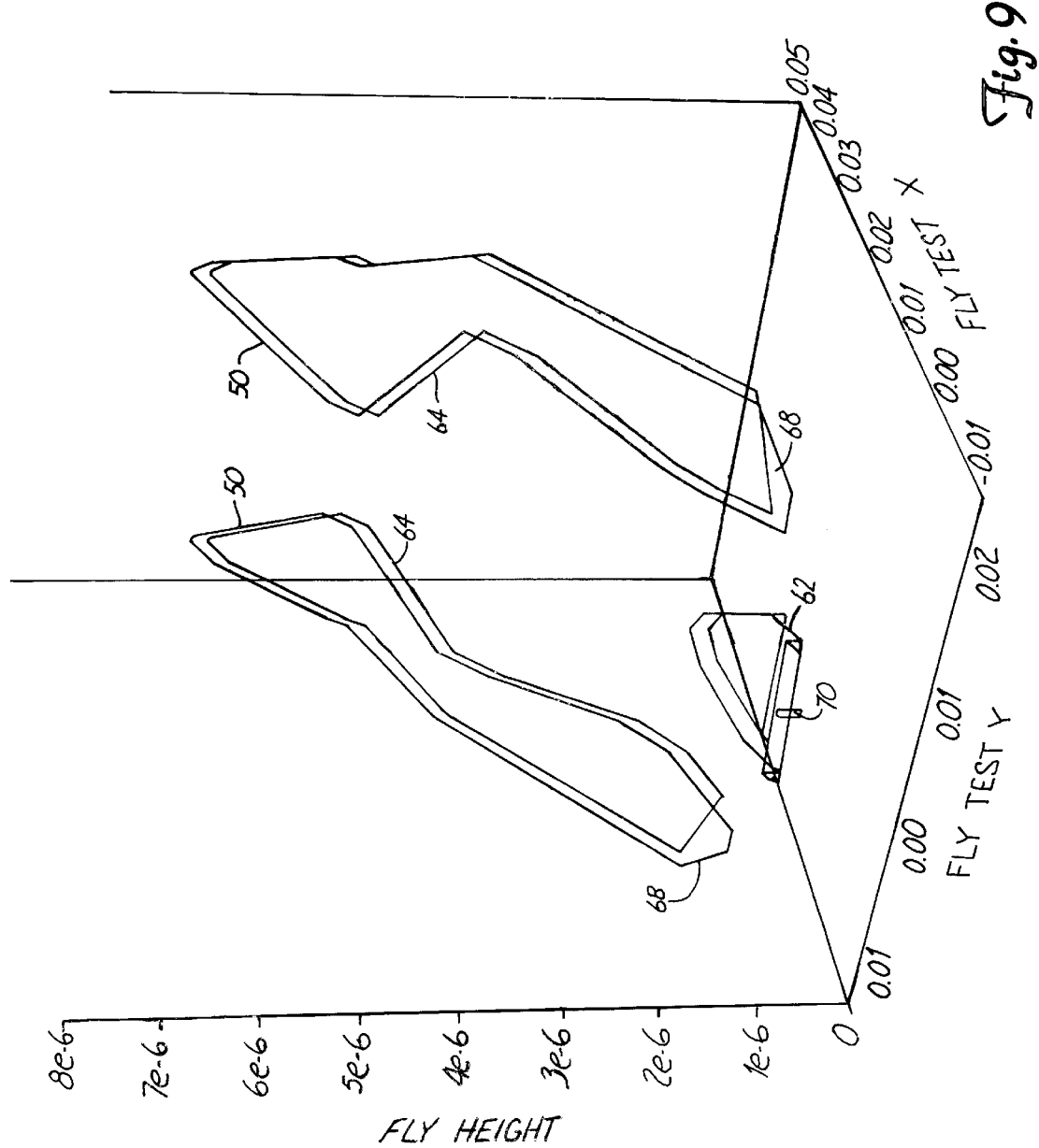

INCREASED MECHANICAL SPACING THROUGH LOCALIZED CONTINUOUS CARBON OVERCOAT

CROSS-REFERENCE TO RELATED APPLICATION(S)

The present application claims the benefit of earlier filed U.S. Provisional application Ser. No. 60/094,419, entitled INCREASED MECHANICAL SPACING THROUGH LOCALIZED CARBON OVERCOAT filed on Jul. 21, 1998.

BACKGROUND OF THE INVENTION

The present invention relates to disc drive storage systems having one or more transducer head assemblies with an air bearing slider that "flies" relative to a rotating disc. and, more particularly, to an overcoat configuration used on such a slider.

Many computer disc drives use discs coated with a magnetizable medium for storage of digital information. The discs are mounted on a spindle motor which causes the discs to spin. Magnetic transducers are supported over the rotating discs, and each transducer writes information to and reads information from the disc surface in any of a plurality of circular, concentric data tracks.

Each transducer head assembly includes a gimbal and an air bearing slider that "flies" relative to the rotating disc and carries the magnetic transducer proximate the rotating disc. An actuator arm moves and positions the slider and the transducer from track to track on the disc surface. The actuator arm includes a load beam for each head gimbal assembly. The load beam provides a preload force which forces the head gimbal assembly toward the disc surface. The gimbal is positioned between the slider and the load beam to provide a resilient support connection for the slider. The gimbal is in point contact with the slider, and provides a point about which the slider can pitch and roll responsive to the wind and while following the topography of the disc.

The sliders include an airbearing surface defined between or around recessed portions. The air bearing surface generally faces the surface of the disc. As the disc rotates, the disc drags air under the slider and along the air bearing surface in a direction approximately parallel to the tangential velocity of the disc. As the air passes beneath the air bearing surface, the incident air causes the slider to lift and fly above the disc surface. The shape of the air bearing surface significantly affects the lift and flying characteristics of the slider.

In many sliders, the air bearing surface is provided with a crown from the leading end to the trailing end. The air bearing surface may also be formed with a cross-curve from one side to the other. The crown and the cross-curve can be formed as the intersection of two cylindrical profiles, or as a spherical profile to the air bearing surface.

The "flying height" of the slider or clearance at the transducer is an important parameter to the disc drive performance. It is desired to minimize the flying height, and to minimize variations in flying height. A consistent, minimal flying height results in increase areal density of recording and a reduced chance of data error. However, as flying height is continually decreased, the tribological interaction between the disc and the slider becomes more critical toward preventing crashes.

While the disc drive is not operating, rotation of the discs is typically stopped. Without the incident wind, the slider is parked in contact with the disc on a landing zone. Interaction between the slider and disk during parking, start-up and slow down is also important to disc drive performance. During start-up, the static friction or "stiction" between the slider and the disc must not be so great as to exceed to power of the spindle motor. Wear on the slider or the disc during start-up and slow-down should be minimized or directed at non-critical features of the slider and disc.

In many sliders, the air bearing surface includes a pair of side rails each positioned along side edges about a recessed central cavity. The side rail closest to the disc hub is called the "inner rail" and the side rail closest to the disc rim is called the "outer rail". A leading taper may be used to pressurize the air as the air is dragged by the disc under the air bearing surface. The rails may extend from the taper to the trailing edge. A self-loading, negative (or subambient) pressure air bearing slider (NPAB) includes a cross rail which extends between the side rails and is positioned near the slider's leading edge. The cross rail can also be referred to as a "throat" or a "dam". The cross rail impedes incident air from the trailing central cavity. The air passing beneath the slider expands in the cavity, resulting in a decrease in pressure to subambient. The subambient pressure cavity may recessed from one-tenth to ten microns from the air bearing surface. In some slider designs, the air bearing surface includes a central pad toward the trailing edge of the central cavity. In other designs, central rails are included between the side rails. The transducer is typically mounted at the trailing edge of the slider, either on one or both of the side rails or on the central pad or central rail. If the transducer is mounted on a central pad or central rail, the side rails may be truncated prior to the trailing edge.

The disc tangential velocity is greater at outer tracks than at inner tracks, resulting in differing wind speeds dependent upon where the slider is positioned over the disc. Many disc drives utilize rotary actuators which move the slider from track to track over a rotary arc. In rotary actuated drives, the slider changes "skew angle" from inner tracks to outer tracks. Differing wind speeds and differing skew angles commonly contribute to variations in flying height.

Manufacture of the slider includes numerous fabrication steps, which are typically carried out in batch form to a plurality of sliders to increase efficiency. A typical fabrication process begins with a wafer of substrate material of a thickness which generally corresponds to the desired lengths of the sliders. An array of transducers are photolithographically fabricated on the wafer as known in the art. The wafer is then be cut into slider bars, with each slider bar including a line of sliders. The cut surfaces provide the top faces and bottom (i.e., air bearing) faces of the sliders. The air bearing faces are lapped to a smooth and flat surface suitable for application of milling pattern masks, and the leading edge of the slider bar may be lapped at an angle to provide the taper. Any crown or cross-curve may also be lapped into the sliders. The slider bars are oriented bottom-face-up (i.e., air bearing face exposed, transducers on a side face) and reassembled on a processing substrate to form a second array. Overcoat material is deposited onto the air bearing face and exposed pole tip of the transducer. The second array is photolithographically processed, removing material to form the cavity and define the rails and any crossbar and/or central pad. For instance, ion milling, chemical etching, or Reactive Ion Etching (RIE) may be used for material removal. Additionally lapping or reflat processes may further smooth the air bearing surface. The slider bars are cut to form individual sliders and removed from the processing substrate, and the individual sliders are attached into the head gimbal assemblies.

Each of the fabrication steps is not entirely controllable. Each additional fabrication step increases the time required for fabrication, increases slider fabrication cost, reduces slider yield by stacking up additional tolerances, and complicates slider design and modeling. At the same time as a highly efficient fabrication process is desired, the resultant product must provide the minimal flying height for increased areal density, and also maximal robustness against crashes.

BRIEF SUMMARY OF THE INVENTION

The present invention is an air bearing slider for a disc drive, having an overcoat localized on the air bearing surface to provide a continuous covering over a leading portion of the air bearing surface. The overcoat terminates in a trailing cut-off line, and a trailing portion of the air bearing surface is not covered by overcoat. By removing the overcoat from the trailing portion of the air bearing surface, the flying height of the transducer is minimized because the overcoat does not take up any of the head-disc separation budget. By having the overcoat in a continuous covering over the leading portion of the air bearing surface, the entirety of the air bearing surface that ordinarily contacts the recording medium in contact/start/stop is protected by a uniform flat overcoat layer. In one aspect of the invention, the overcoat also covers the pole tips of the transducer at a pole tip recession from the air bearing surface. In another aspect of the invention, the trailing cut-off line is disposed at an angle to expose the trailing corners of the air bearing surface, such that all of the overcoat is elevated above the lowermost portion of the air bearing surface through pitch and roll angles of flying at inner and outer radii.

BRIEF DESCRIPTION OF THE DRAWINGS

FIG. 3 represents a cross-sectional view of FIG. 2 taken along line 3—3, with depth on the y-axis greatly magnified.

FIG. 4 represents the cross-sectional view of FIG. 3 with depth even more greatly magnified.

FIG. 5 shows the cross-sectional view of FIG. 4 of the slider over a stationary disc.

FIG. 6 shows the cross-sectional view of FIG. 5 after the disc has started its rotational movement.

FIG. 7 shows the cross-sectional view of FIGS. 5 and 6 as the disc approached take-off velocity.

FIG. 9 shows a schematic view of the edges of the overcoat and the edges of the air bearing surface during flying of the slider of the present invention over the disc.

DETAILED DESCRIPTION OF THE PREFERRED EMBODIMENTS

Figure 1:
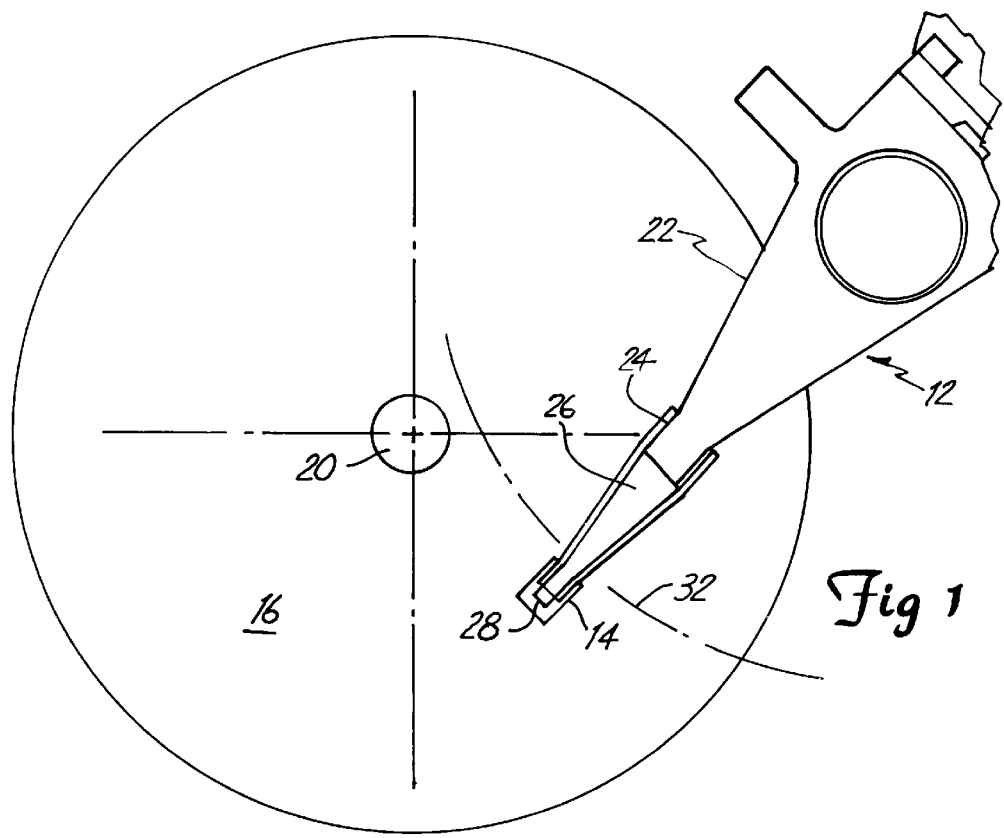
FIG. 1 is a top plan view of a disc drive data storage device in which the present invention is useful.

FIG. 1 is a top plan view schematically showing a disc drive 10 with an actuator arm 12 supporting a slider 14 proximate to the surface 16 of a rotatable disc 18. The disc 18 may be one of several discs coaxially stacked in a disc pack and rotated together about a spindle 20. The actuator arm 12 includes a supporting arm 22, a swage plate 24 and a load beam 26. The load beam 26 is connected to a gimbal spring 28 which carries the air bearing slider 14. The slider 14 carries a transducer 30 (shown in FIG. 2) which communicates with data locations on the disc surface 16.

The actuator arm 12 rotates to position the slider 14 along an arc 32 over various data tracks on the disc surface 16 between an inside radius and an outside radius. For instance, a rotary moving coil actuator including a voice coil motor (not shown) can be used to pivot the actuator arm 12. As the disc 18 rotates, the disc surface 16 drags air under the slider 14 and its air bearing surface in a direction approximately parallel to the tangential velocity of the disc surface 16. Contact friction between the disc surface 16 and the air produces a "wind", and at any given radius (r) the wind is traveling generally at the same speed as the disc surface 16 (i.e., rω), where ω is the angular velocity of the disc). Thus the wind speed differs greatly between the inside and outside radius. As the slider 14 accesses across the disc surface 16 through the arc 32, the angle of the slider 14 relative to the incident wind velocity changes, creating a skew angle which differs between the inside and outside radius. The disc surface 16 may also have a landing zone where the slider 14 takes off and lands and rests while the disc drive 10 is not in use, with the remainder of the flying surface of the disc 18 used as a data zone. Although the preferred embodiment is described as an air bearing slider 14, other fluids could alternatively be used in the interface between the disc 18 and the slider 14.

Figure 2:
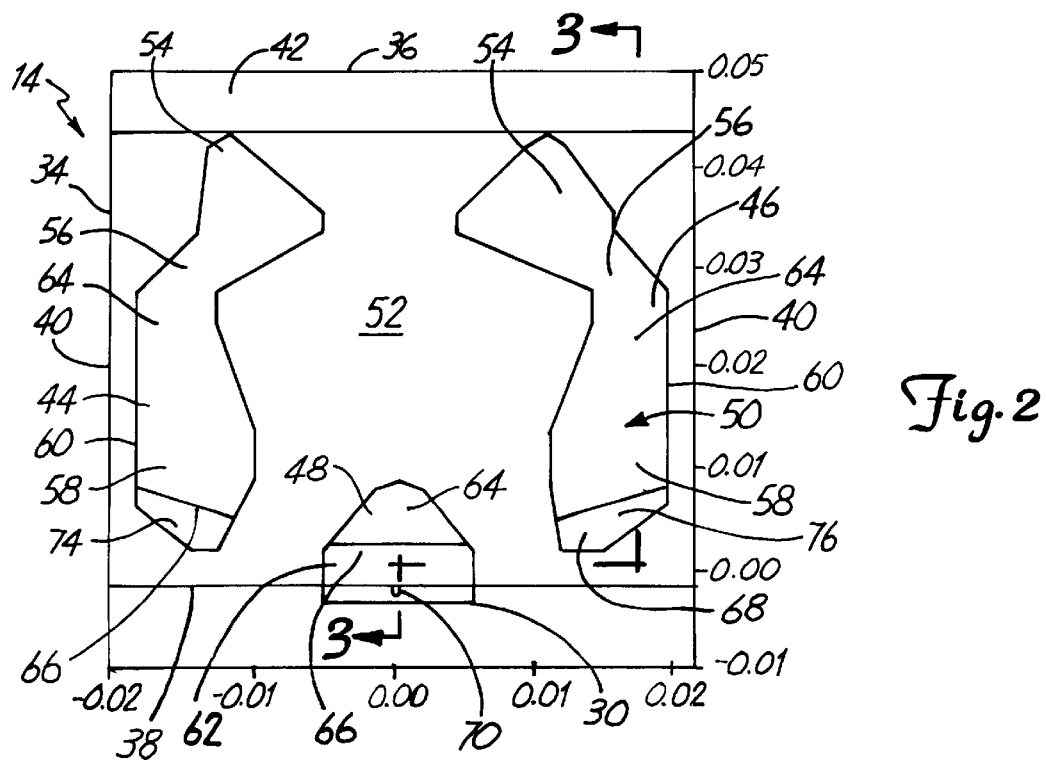
FIG. 2 is a layout view of the slider of the present invention.

FIG. 2 shows a bottom view layout of a slider 14 according to the present invention, as viewed from the disc surface 16. The air bearing slider 14 is quite small, and both the length and width dimensions are magnified in FIG. 2 (such as by factor of about 80) to show the design features of the slider 14. The slider 14 has a slider body 34 with a leading edge 36, a trailing edge 38, and first and second side edges 40. A taper 42 is provided at the leading edge 36 of the slider 14. The slider 14 includes two rails 44, 46 and a central island or pad 48. The rails 44, 46 extend generally between the leading edge 36 and the trailing edge 38. The air bearing surface 50 for the slider 14 includes the disc opposing faces of the rails 44, 46 and the central pad 48. The taper 42 is angled at a few milliradians relative to the general plane of the air bearing surface 50.

A cavity 52 is defined between the rails 44, 46 and the central pad 48. The cavity 52 may be for instance about 0.5 to 8 microns deep relative to the air bearing surface 50. The cavity 52 is typically formed by removing material from the slider body 34 in a photolithographic/etching process suitable for the material used for the slider body 34. For instance, the preferred slider body 34 is formed of AlTiC, an $Al_2O_3$ titanium carbon ceramic. If desired for flying performance, a cavity dam or cross rail (not shown) may be included toward the leading edge 36 to reduce the pressure in the cavity 52 to subambient. Such a negative pressure slider is taught for instance in U.S. Pat. No. 5,721,650 to Crane et al. entitled "Self-loading Disc Head Slider Having Blunt Cross Rail", incorporated herein by reference.

If the slider 14 is mounted on the top surface 16 of the disc 18, rail 44 is designated as the inside rail (flying closest to the disc hub) and rail 46 is designated as the outside rail (flying closest to the disc rim). Mounting of the slider 14 on the bottom surface of the disc 18 will result in the opposite inside/outside orientation of the rails 44, 46.

In the preferred embodiment, both rails 44, 46 have a triangular leading section 54, a waist section 56, and a trailing section 58 with an outer edge 60 in line with the first and second side edges 40 of the slider 14. The present invention may be used with many other shapes of rails and central pads, and the specific design features illustrated are not intended to limit the scope of the invention. For instance, the central pad may be a center rail, or may not be present at all. As the wind passes beneath the rails 44, 46 and the central pad 48, pressure on the air bearing surface 50 caused by skin friction creates a hydrodynamic lifting force that causes slider 14 to lift and fly above the disc surface 16.

The transducer 30 is fabricated on the trailing edge 38 of the slider body 34. In this embodiment, the active pole tip of the transducer 30 is centered on the trailing end 62 of the central pad 48. The transducer 30 may alternatively be placed on the trailing edge 38 at one or both of the inner or outer rails 44, 46. The transducer 30 communicates with the magnetic medium in the disc 18 to record and retrieve data. The transducer 30 is fabricated as known in the art. For instance, the preferred transducer 30 is formed on the trailing edge 38 of the slider body 34 within an alumina substrate. Encapsulation of the transducer 30 within an alumina substrate maintains the structural integrity of the transducer 30 during manufacturing processes and during use.

An overcoat 64 is present on a leading portion of the air bearing surface 50, but is absent along a trailing portion of the air bearing surface 50 behind a trailing cut-off line 66. The overcoat 64 provides a continuous covering over the leading portion of the air bearing surface 50. In the preferred embodiment, the leading portion continuously covered by the overcoat 64 includes the leading section 54, the waist section 56, and part of the trailing section 58, i.e., all of the air bearing surface 50 in front of the trailing cut-off line 66. The trailing cut-off line 66 is preferably positioned within a range of about 60 to 95% from the taper 42 to the trailing end 68 of the air bearing surface 50. At least part of the trailing cut-off line 66 is preferably at an angle to the leading and trailing edges 36, 38. In the preferred embodiment, the trailing cut-off line 66 is at an angle over the inside rail 44, at an opposite angle over the outside rail 46, and parallel to the trailing edge 38 over the central pad 48.

The overcoat 64 is applied in a very thin layer in front of the trailing cut-off line 66. For instance, the overcoat 64 should have a generally uniform thickness of less than about 100 Angstroms over the leading portion of the air bearing surface 50. The preferred carbon overcoat 64 is applied in a thickness of about 0.2 microinches (about 55 Angstroms). The material of the overcoat 64 is selected for the desired protective and tribological properties. For example, the overcoat 64 in front of the trailing cut-off line 66 may be diamond-like carbon ("DLC") or amorphous hydrogenated carbon as taught by Grill et al. U.S. Pat. No. 5,159,508 entitled "Magnetic Head Slider Having a Protective Coating Thereon," which is incorporated herein by reference. An adhesive layer (not independently shown) may be deposited underneath the overcoat 64 to enhance attachment of the overcoat 64 to the slider body 34. The overcoat 64 enhances the tribological performance of the slider/disc interface.

In addition to having overcoat in front of the trailing cut-off line 66, a small area 70 of overcoat covers the pole tips of the transducer 30. Overcoat 70 covering the pole tips of the transducer 30 decreases transducer sensitivity to corrosion and to potential damage from electrostatic discharge, as well as to wear and potential damage from inadvertent contact with the disc 18. The dot 70 of DLC overcoat may be about 800 microinches (20 microns) wide to cover the pole tips of the transducer 30. Alternatively, overcoat may be applied to cover a larger part or all of the alumina substrate of the transducer 30, including faces of the transducer 30 which are perpendicular to the disc surface. Use of overcoat to cover more of the alumina of the transducer 30 may further limit corrosion and may help prevent the alumina from swelling in high humidity.

The preferred embodiment has an air bearing surface length which is on the order of 1000 times the cavity depth. FIG. 3 represents a cross-sectional view of FIG. 2 taken along line 3—3, with length on the x-axis magnified and with depth on the y-axis greatly magnified as compared to length on the x-axis. The depth magnification factor, permits showing the cavity floor relative to the length of the air bearing surface 50. For instance, the cavity floor 52 may be at a depth of about 50 microinches relative to the air bearing surface 50, and the air bearing surface 50 may be about 0.05 inches (50,000 microinches) long. FIG. 3 represents this relationship by magnifying length by a factor of about 100 and by magnifying depth by a factor of about 4,000. Other embodiments may use different cavity depths and different lengths of air bearing surfaces.

FIG. 4 represents the same cross-sectional view as FIG. 3 but with an additional depth magnification factor of about 100. That is, FIG. 4 represents a cross-sectional view of FIG. 2 taken along line 3—3, with depth on the y-axis magnified by a factor of about 4,000 as compared to length on the x-axis.

With this depth magnification factor, a crown 72 can be seen on the air bearing surface 50. The crown 72 has a small height, such as about 5 microinches or less. The preferred crown 72 is about 1 microinch from the taper 42 to the trailing end 68 of the air bearing surface 50. Other embodiments may use a different crown height. The crown 72 is provided for a variety of reasons. The crown 72 reduces the likelihood of corner chipping and increases the mechanical reliability of the lapping process used to finish the air bearing surface 50. The crown 72 also plays a significant role in the tribological interaction between the slider 14 and the disc 18, particularly during the contact/start/stop operation.

The air bearing surface 50 of the slider 14 is quite smooth, and appears smooth in FIG. 4 despite the great depth magnification. For instance, the air bearing surface 50 may be finished to a surface roughness $R_a$ of about 3 to 8 Angstroms (0.01 to 0.03 microinches).

The transducer 30 is positioned at a pole tip recession from the air bearing surface 50 of the central pad 48. For instance, the pole tip recession may be about ¼ of a microinch. The preferred overcoat thickness is thus about the same as or slightly less than the preferred pole tip recession. With this pole tip recession, an overcoat dot 70 of 0.2 microinches thickness can be placed over the pole tips and still result in an overcoat surface which does not extend beyond or is recessed from the trailing end 68 of the air bearing surface 50.

FIGS. 5–9 continue the depth magnification of FIG. 4, and show the contact/start/stop operation of the slider 14 relative to the disc 18. FIG. 5 shows the slider 14 at rest in a landing position on the stationary disc 18. As taught in copending application Ser. No. 08/702,325, filed Aug. 22, 1996 and incorporated herein by reference, the landing zone on the disc surface 16 (where the slider 14 starts and stops) has a surface roughness, and may include a thin overcoat and a thin lubricant layer (not independently shown). For instance, the surface roughness of the landing zone may be from about 10 to 150 Angstroms. The surface roughness on the landing zone may thus be on the same order of magnitude as the thickness of the overcoat 64 on the slider 14, but an order of magnitude smaller than the crown 72 on the slider 14. The slider 14 at rest centers about the gimbal point, such that only a central portion of the crowned air bearing surface 50 contacts the disc surface 16. The entirety of the central portion of the air bearing surface 50 which could make contact with the stationary disc 18 is continuously covered by the overcoat 64, and the roughness of the slider 14 in contact with the disc surface 16 is determined almost exclusively by the roughness of the air bearing surface 50 underneath the overcoat 64.

In FIG. 6, the disc 18 has started its rotational movement during start-up of the disc drive 10. Due to friction of the disc 18, and more particularly due to the moment of the friction force on the slider 14 about the gimbal attachment, the slider 14 pivots or rocks rearward about the gimbal point. The contact area on the slider 14 moves forward on the rails 44, 46. The pressure force of the air is not yet significant, and a forward portion of the crowned air bearing surface 50 contacts the disc surface 16. The entirety of the forward portion of the air bearing surface 50 which could make contact with the slowly moving disc 18 is continuously covered by the overcoat 64.

In FIG. 7, the disc 18 has gained rotational speed, and the slider 14 is just about ready to takeoff. The hydrodynamic lift force of the wind on the taper 42 and the forward portion of the air bearing surface 50 provides a counteracting moment on the leading side of the slider 14. The slider 14 rotates or rocks forward about the gimbal point into a positive slope or pitch, such that the leading edge 36 is above the trailing edge 36 of the slider 14. The pressure force of the air is not yet enough to completely lift the slider 14 from the disc surface 16, and a rearward portion of the crowned air bearing surface 50 contacts the disc surface 16. The entirety of the rearward portion of the air bearing surface 50 which could make contact with the accelerating disc 18 is continuously covered by the overcoat 64.

Figure 8:
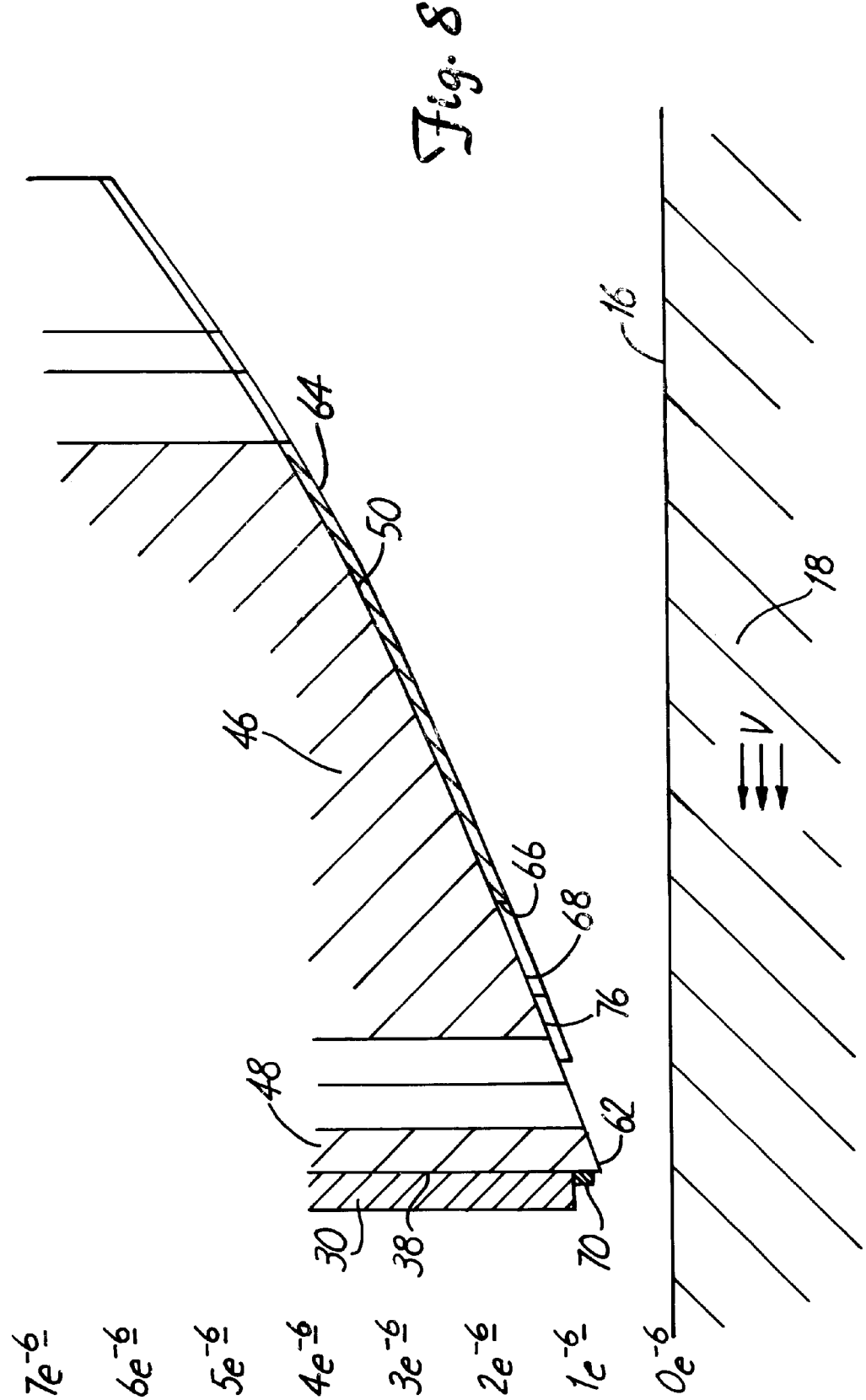
FIG. 8 shows the cross-sections view of FIGS. 5–7 during flying over the disc.

In FIGS. 8 and 9, the disc 18 has reached full velocity and the slider 14 is flying over the disc surface 16. Once the slider 14 is flying, actuator arm 12 (shown in FIG. 1) moves the slider 14 from the landing zone to the data zone of the disc surface 16. In the preferred embodiment, the data zone of the disc 18 is smoother than the landing zone, and the data zone has a surface roughness $R_a$ of no greater than about 20 Angstroms, such as a surface roughness $R_a$ of about 2 to 6 Angstroms. At full disc velocity, the slider 14 may take off and fly at a pitch of approximately 120 microradians, at a transducer flying height on the order of 1 microinch (about 100 to 300 Angstroms).

During flying, a considerable part of the pressure supporting the slider 14 occurs at the trailing edge of the air bearing surface 50 where the very small clearance between the disc surface 16 and the air bearing surface 50 occurs. The trailing cut-off line 66 of the overcoat 64 is in front of the trailing ends 68 of the air bearing surface 50. By having the overcoat 64 be absent from the trailing ends 68 of the rails 44, 46 and the central pad 48, the slider 14 flies at a lowered flight height. With the trailing ends 68 of the air bearing surface 50 of the slider 14 is flying at a flying height which in the range of 2 to 6 times the thickness of the overcoat 64, removing the overcoat 64 from the trailing ends 68 of the air bearing surface 50 results in a significant improvement (i.e., from about 10 to 50%) in flying height of the pole tips of the transducer 30. The absence of the overcoat 64 over the trailing edges of the rails 44, 46 and the central pad 48 thus results in an improved mechanical spacing or "margin" between the pole tip and the magnetic medium, allowing a greater areal density of data.

During landing of the slider 14 on the disc surface 16, the pitch angles shown in FIGS. 5–8 occur in reverse order. Throughout the landing/stopping operation, the entirety of the air bearing surface 50 which could make contact with the disc surface is continuously covered by the overcoat 64.

Note that, without the great depth magnification of FIGS. 5–8, the air bearing surface 50 is very flat and the slider 14 flies with the air bearing surface 50 very parallel to the plane of the disc surface 16. To put this flatness and flying height of the air bearing surface 50 in context to the length and width of the slider 14, if the slider was enlarged to the size of a football field, the trailing edge of the enlarged slider would fly at about 1/10 of an inch over the planar surface of the football field, and the pitch angle would put the leading edge of the enlarged slider about ½ inch higher than the trailing edge.

The continuous nature of the overcoat 64 covering the air bearing surface 50 in front of the cut-off line 66 is important for proper tribological characteristics. In particular, the air bearing surface 50 presents a crowned surface of uniforms smoothness throughout all phases of contact with the disc surface 16. The overcoat 64 is believed to be uniformly deposited such that the roughness of the surface of the overcoat 64 matches the roughness of the underlying air bearing surface 50 of the rails 44, 46 and central pad 48. Thus the frictional interaction between the disc 18 and the slider 14 is determined by the roughness of the air bearing surface 50 of the slider body 34 (unchanged by the overlying overcoat 64) against the roughness of the disc surface 18. The continuous protection of the overcoat 64 serves an important function in preventing fatal "stiction" events.

The continuous nature of the overcoat 64 covering the air bearing surface 50 in front of the cut-off line 66 is important for proper wear characteristics. Because one continuous layer of overcoat 64 covers each of the air bearing surfaces 50 throughout the potential contact area to the disc surface 16, the overcoat 64 presents only flat surfaces (i.e., no edges parallel to the leading edge 36 of the slider 14) to the disc surface 16. This results in a robust overcoat 64 over the majority of the air bearing surface 50, and also in maximum wear benefits from the overcoat 64, reducing wear both to the disc 18 and to the slider body 34.

The existence of the overcoat 64 continuously covering the forward portion of the air bearing surface 50 appears to also play an important role in robustness of the disc drive 10 for surviving crashes. The friction between a slider 14 and a moving disc 18 (and thus the damage due to contact in a "crash") appears to increase dramatically when the disc surface 16 and the air bearing surface 50 are both polished very smooth. The overcoat 64 of the present invention is particularly applicable for data zones having a roughness $R_a$ of no greater than about 6 Angstroms used with sliders having an air bearing surface roughness $R_a$ of no greater than about 8 Angstroms. The increased margin with the overcoat 64 of the present invention makes contact between the slider 14 and the disc surface 16 less likely to occur in the first place. The continuous overcoat 64 in front of the cut-off line 66 also presents a smooth surface for interaction with the wind.

The desired position of the trailing cut-off line 66 of the overcoat 64 is determined through analysis of the pitch and roll characteristics of the airborne slider 14, to make maximum use of the "head-disc separation budget". The head-disc separation budget analysis takes into account the fact that the close point of the flying air bearing surface 50 to the disc surface 16 is normally one corner of the central pad 48 at the intersection of the slider body 34 and the transducer 30. The trailing cut-off line 66 on the rails 44, 46 uses the same analysis to take into account flying variations and roll and slope that could make the trailing end 62 of one of the rails 44,46 the closest point. In the preferred embodiment, the maximum slider roll due to differing skew angles is about 1/10th of the flying pitch of the slider 14, i.e., on the order of about 10 microradians. This roll results in one rail being about 0.4 microinches lower than the other rail, with the trailing corner of the air bearing surface 50 being in closest proximity to the disc surface 16. For positive roll angles when the inside rail 44 is lower, the trailing cut-off line 66 over the inside rail 44 is angled to expose an inside trailing corner portion 74 of the air bearing surface 50. Even at the maximum positive roll angle, all of the overcoat 64 is at a higher altitude over the disc surface 16 than the inside trailing corner portion 74 of the air bearing surface 50. For negative roll angles when the outside rail 46 is lower, the cut-off line 66 over the outside rail 46 is angled in the opposite direction to expose an outside trailing corner portion 76 of the air bearing surface 50. Even at the maximum negative roll angle, all of the overcoat 64 is at a higher altitude over the disc surface 16 than the outside trailing corner portion 76 of the air bearing surface 50. In this way, the entirety of the overcoat 64 is assured to be at a higher altitude over the disc surface 16 than the lowermost trailing end of the air bearing surface 50, for all attitudes (i.e., combinations of pitch and roll angles) at which the slider 14 flies over the disc 18.

The fabrication of the slider 14 of the present invention begins similar to the prior art slider manufacture. The preferred fabrication process begins with a wafer of substrate (AlTiC) material of a thickness which generally corresponds to the desired lengths of the sliders 14. An array of transducers 30 are photolithographically fabricated on the wafer as known in the art. The wafer is then be cut into slider bars, with each slider bar including a line of sliders 14. The cut surfaces provide the top faces and bottom (i.e., air bearing) faces of the sliders 14. After lapping, the slider bars are oriented bottom-face-up (i.e., air bearing face exposed, transducers 30 on a side face) and reassembled on a processing substrate to form a second array. A plastic fill-in material is used to planarize the second array, with the plastic surface being 2 to 10 microns beneath the air bearing surfaces 50.

A first preferred method of applying the overcoat 64 is a subtractive method. A blanket of overcoat is vacuum deposited over the second array of sliders 14. If desired, a molecularly thin layer of an adhesive material such as silicon may be deposited prior to deposition of overcoat, to enhance adhesion of overcoat material to the ceramic of the slider body 34. A stencil mask of photoresist is deposited over the second slider array, to protect the portions of each air bearing surface 50 in front of the trailing cut-off line 66, and to protect and cover the pole tips of the transducer 30. After application of the stencil mask, the unprotected portions of overcoat are removed, such as through an oxygen or an oxygen carbon tetrafluorine ($OCF_4$) plasma removal. An oxygen plasma is preferred for removal of portions of a DLC overcoat, as the oxygen plasma selectively removes the DLC and then slows or stops with minimal removal of the underlying ceramic. However, if a silicon layer was used to adhere the DLC, an additional $OCF_4$ plasma removal step may be needed (after the oxygen plasma) to remove the silicon-carbide layer. After the unprotected overcoat has been removed, solvent may be used to remove the remaining photoresist, leaving the underlying overcoat 64 in place.

A second preferred method of applying the overcoat 64 is an additive method. A stencil mask is photolithographically placed over the slider array, to cover the portions of each air bearing surface 50 behind the trailing cut-off line 66, but leaving the pole tips of the transducer 30 exposed. After application of the stencil mask, a blanket of overcoat is deposited over the sliders. If desired, a molecularly thin layer of adhesive material may be deposited prior to deposition of overcoat (before or after the stencil mask). After deposition of overcoat, the portions of overcoat over the stencil mask are removed by a mechanical material removal process, such as by sodium bicarbonate blasting. The portions of the overcoat without the underlying mask survive the blasting and remain as the overcoat 64 covering the forward portions of the air bearing surface 50 in front of the cut-off line 66 and covering the pole tips of the transducer 30.

Both of these preferred overcoat deposition processes will typically result in a relatively sharp or distinct edge for the trailing cut-off line 66 of the overcoat 64. Alternatively, the trailing cut-off line 66 may be made less distinct such as by using the "crown shape" overcoat deposition process disclosed in Ganapathi et al., U.S. Pat. Nos. 5,654,850 and 5,336,550, incorporated herein by reference.

After the patterned overcoat 64 has been applied, the fabrication process may continue in accordance with prior art methods. Material is removed to form the cavity 52 and define the rails 44, 46 and the central pad 48. For instance, ion milling, chemical etching, or Reactive Ion Etching (RIE) may be used for material removal. Throughout this subsequent processing, the overcoat dot 70 over the pole tips serves to protect the pole tips from corrosion, which otherwise may be accelerated through the processing steps to form the cavity 52. The slider bars are cut to form individual sliders 14 and removed from the processing substrate, and the individual sliders 14 are attached into the head gimbal assemblies.

Although the present invention has been described with reference to preferred embodiments, workers skilled in the art will recognize that changes may be made in form and detail without departing from the spirit and scope of the invention.

What is claimed is:

1. An air bearing slider for a disc drive, comprising:
    a slider body having a disc opposing face with an air bearing surface defined thereon, the slider body having a trailing edge;
    a transducer with pole tips on the trailing edge of the slider body; and
    an overcoat localized on the air bearing surface to provide a continuous covering over a leading portion of the air bearing surface, while leaving a trailing portion of the air bearing surface uncovered, and wherein the overcoat also covers the pole tips of the transducer;
    wherein the transducer is positioned at a pole tip recession relative to the air bearing surface, such that the overcoat over the transducer does not extend beyond the air bearing surface.

2. The air bearing slider of claim 1, wherein the air bearing surface extends from a leading end to a trailing end, wherein the overcoat continuously covers the leading portion in front of a trailing cut-off line and does not cover the trailing portion behind the trailing cut-off line, and wherein the trailing cut-off line is positioned within a range of about 60 to 95% from the leading end to the trailing end of the air bearing surface.

3. The air bearing slider of claim 1, wherein the overcoat has a generally uniform thickness of less than about 100 Angstroms over the leading portion of the air bearing surface.

4. The air bearing slider of claim 1, wherein the air bearing surface comprises an inside rail, an outside rail, and a central pad, and wherein the overcoat is localized over a leading portion of the inside rail, a leading portion of the outside rail and a leading portion of the central pad.

5. The air bearing slider of claim 1, wherein the overcoat is fabricated of diamond like carbon, and wherein the slider body is fabricated of AlTiC.

6. The air bearing slider of claim 1, wherein the air bearing surface is crowned from a leading end to a trailing end.

7. The air bearing slider of claim 1, wherein the overcoat terminates in a trailing cut-off line between the continuous covering over the leading portion and the uncovered trailing portion behind the trailing cut-off line, and wherein at least some of the trailing cut-off line is at an angle to the trailing edge of the slider body.

8. The air bearing slider of claim 1, wherein the overcoat continuously covers the leading portion in front of a trailing cut-off line and does not cover the trailing portion behind the trailing cut-off line, wherein the air bearing surface comprises an inside rail and an outside rail, and wherein the trailing cut-off line over the inside rail is angled rearwardly toward the outside rail to expose an inside trailing corner portion of the air bearing surface for positive roll angles, and wherein the cut-off line over the outside rail is angled rearwardly toward the inside rail to expose an outside trailing corner portion of the air bearing surface for negative roll angles.

9. An air bearing slider for a disc drive, comprising:

a slider body having a disc opposing face with an air bearing surface defined thereon, the air bearing surface comprising an inside rail and an outside rail, the slider body having a trailing edge; and means for protecting the air bearing surface and for minimizing flying height of the air bearing surface, wherein the means for protecting the air bearing surface and for minimizing flying height of the air bearing surface comprises an overcoat localized on the air bearing surface to cover a leading portion of the air bearing surface in front of a trailing cut-off line and to not cover a trailing portion behind the trailing cut-off line, wherein at least some of the trailing cut-off line is at an angle to the trailing edge of the slider body, wherein the trailing cut-off line over the inside rail is angled rearwardly toward the outside rail to expose an inside trailing corner portion of the air bearing surface for positive roll angles, and wherein the cut-off line over the outside rail is angled rearwardly toward the inside rail to expose an outside trailing corner portion of the air bearing surface for negative roll angles.

10. The air bearing slider of claim 9, wherein the overcoat continuously covers all of the air bearing surface that is in front of the trailing cut-off line, and wherein the overcoat has a generally uniform thickness of less than about 100 Angstroms over the leading portion of the air bearing surface.

11. The air bearing slider of claim 9, wherein the air bearing surface further comprises a central pad, and wherein the overcoat also covers a leading portion of the central pad.

12. A disc drive comprising:

a disc for recording information in a data zone, the disc being rotatable to produce a wind;

a slider body having a disc opposing face with an air bearing surface defined thereon, the air bearing surface interacting with the wind to position the slider body at a flying attitude over the disc during rotation, the air bearing surface comprising an inside rail and an outside rail, the slider body having a trailing edge;

a transducer on the trailing edge of the slider body;

a rotary actuator supporting the slider body over the disc between an inside flying radius and an outside flying radius of the disc, wherein the slider body flies at differing roll angles dependent upon flying radius; and an overcoat localized on the air bearing surface to provide a continuous covering over a leading portion of the air bearing surface, while leaving a trailing portion of the air bearing surface uncovered, wherein the overcoat terminates in a trailing cut-off line, wherein the trailing cut-off line over the inside rail is angled rearwardly toward the outside rail to expose an inside trailing corner portion of the air bearing surface such that all of the overcoat is at a higher altitude over the disc than the trailing end of the inside rail at a maximum positive roll angle, wherein the cut-off line over the outside rail is angled rearwardly toward the inside rail to expose an outside trailing corner portion of the air bearing surface such that all of the overcoat is at a higher altitude over the disc than the trailing end of the outside rail at a maximum negative roll angle.

13. The disc drive of claim 12, wherein the disc has data zone over which the slider body flies during transmission of data to and from the disc, the data zone having a roughness $R_a$ of no greater than about 6 Angstroms, and wherein the air bearing surface has a roughness $R_a$ of no greater than about 8 Angstroms.

14. The disc drive of claim 12, wherein the air bearing surface is crowned from a leading end to a trailing end, the overcoat continuously protecting the leading portion of the air bearing surface from contact with the disc as the slider body rocks in contact with the disc during starting and stopping, and wherein the trailing cut-off line is positioned so that, at flying attitude, all of the overcoat is at a higher altitude over the disc than the trailing end of the air bearing surface.

15. The disc drive of claim 12, wherein the transducer has pole tips positioned at a pole tip recession relative to the air bearing surface, and wherein the overcoat also covers the pole tips of the transducer at a thickness such that the overcoat over the transducer does not extend beyond the uncovered air bearing surface.

16. The disc drive of claim 12, wherein the air bearing surface further comprises a central pad, and wherein the overcoat also covers a leading portion of the central pad.

17. The air bearing slider of claim 1, further comprising a transducer with pole tips on a trailing edge of the slider body, the transducer being positioned at a pole tip recession relative to the air bearing surface; and wherein the means for protecting the air bearing surface and for minimizing flying height of the air bearing surface comprises:

an overcoat covering a portion of the air bearing surface while leaving a portion of the air bearing surface uncovered, and wherein the overcoat also covers the pole tips of the transducer at a thickness such that the overcoat over the transducer does not extend beyond the uncovered air bearing surface.

* * * * *

UNITED STATES PATENT AND TRADEMARK OFFICE
CERTIFICATE OF CORRECTION

PATENT NO. : 6,359,754 B1
DATED : March 19, 2002
INVENTOR(S) : Jason W. Riddering et al.

It is certified that error appears in the above-identified patent and that said Letters Patent is hereby corrected as shown below:

Column 12,
Line 51, delete "The air bearing slider of claim 1, further comprising:"
and insert the following:

-- An air bearing slider for a disc drive, comprising:

a slider body having a disc opposing face with an air bearing surface defined thereon:

means for protecting the air bearing surface and for minimizing flying height of the air bearing surface; and --

Signed and Sealed this

Fifth Day of November, 2002

*Attest:*

*Attesting Officer*

JAMES E. ROGAN
*Director of the United States Patent and Trademark Office*